United States Patent
Hooke et al.

(10) Patent No.: US 9,335,230 B1
(45) Date of Patent: May 10, 2016

(54) PRESSURE SENSING METHOD AND APPARATUS FOR GUN-LAUNCHED PROJECTILE

(71) Applicant: The United States of America as Represented by the Secretary of the Army, Washington, DC (US)

(72) Inventors: Ryan Hooke, Sparta, NJ (US); Kyle Schaarschmidt, Bangor, PA (US); Matthew Hawkswell, Great Meadows, NJ (US); Tyler Myers, Lebanon, NJ (US)

(73) Assignee: The United States of American as Represented by the Secretary of the Army, Washington, DC (US)

( * ) Notice: Subject to any disclaimer, the term of this patent is extended or adjusted under 35 U.S.C. 154(b) by 183 days.

(21) Appl. No.: 14/255,401

(22) Filed: Apr. 17, 2014

(51) Int. Cl.
 *G01L 7/08* (2006.01)
 *F42B 35/00* (2006.01)
 *G01L 7/02* (2006.01)

(52) U.S. Cl.
 CPC . *G01L 7/08* (2013.01); *F42B 35/00* (2013.01); *G01L 7/022* (2013.01)

(58) Field of Classification Search
 CPC ........... G01L 7/08; G01L 7/084; G01L 7/022; F42B 35/00

USPC ................. 73/12.08, 715, 731, 822, 862.581
 See application file for complete search history.

(56) References Cited

U.S. PATENT DOCUMENTS

| 4,726,135 A * | 2/1988 | Adams ...................... G01L 5/14 42/1.01 |
| 2012/0312092 A1 * | 12/2012 | Miller ..................... F41A 31/00 73/167 |

* cited by examiner

*Primary Examiner* — Lisa Caputo
*Assistant Examiner* — Roger Hernandez-Prewit
(74) *Attorney, Agent, or Firm* — Henry S. Goldfine

(57) ABSTRACT

A method of determining fluid pressure on a gun-launched projectile relies on deformation of a thin layer of a metallic material that comprises the outer layer of a segment of the projectile body. The axial segment of the projectile body that is selected for pressure measurement is altered or replaced with another axial segment. The altered segment has a thin-walled, structural, metallic sleeve that is concentric with an underlying hollow, metallic cylindrical body. The radially outermost surface of the body underlying the sleeve has a plurality of indentations formed thereon. Measurements of the deformations of the thin-walled sleeve into the indentations in the underlying body are correlated with known deformation and pressure data to determine pressure that was applied to the projectile during its ballistic cycle.

20 Claims, 5 Drawing Sheets

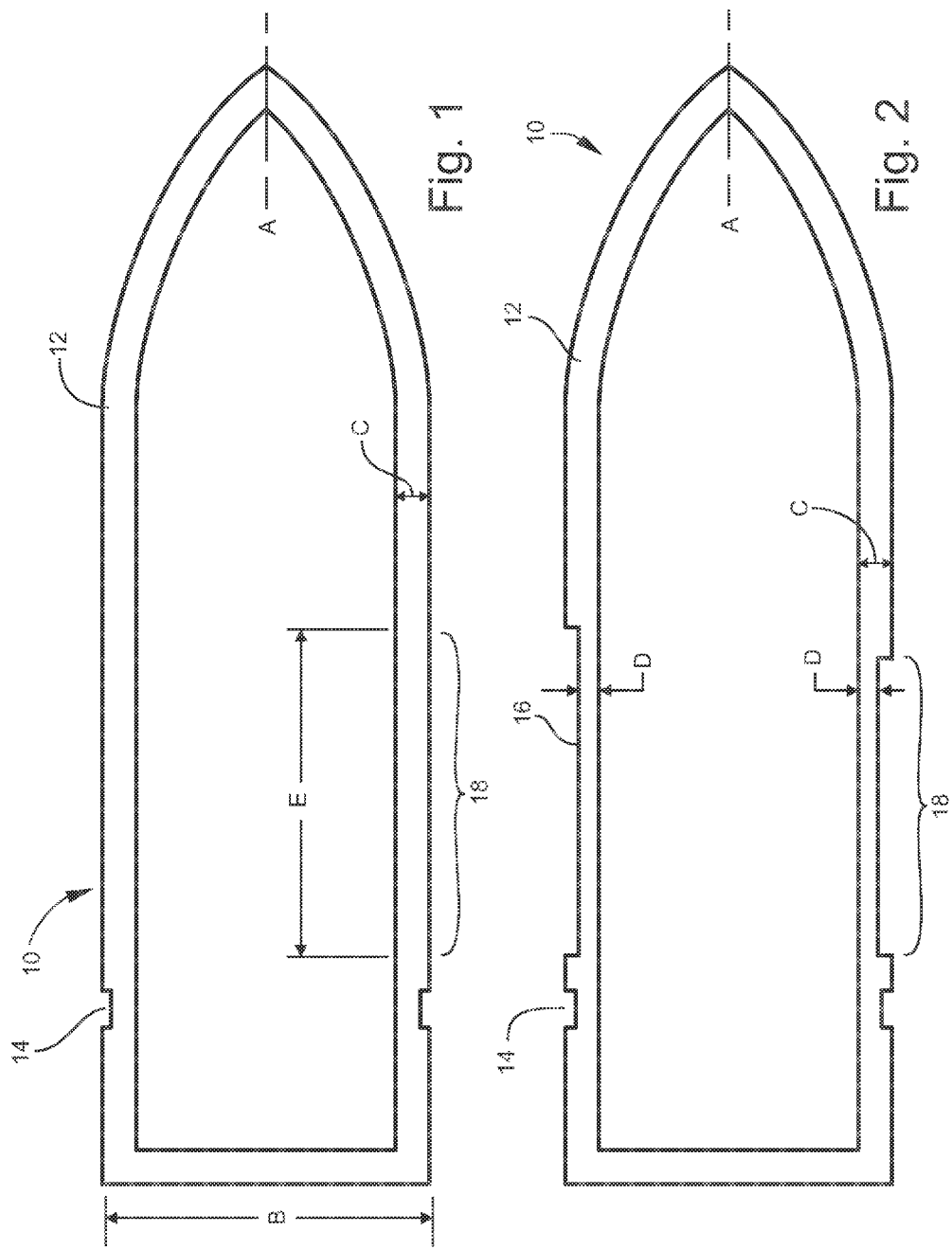

PRESSURE SENSING METHOD AND APPARATUS FOR GUN-LAUNCHED PROJECTILE

STATEMENT OF GOVERNMENT INTEREST

The inventions described herein may be manufactured, used and licensed by or for the United States Government.

BACKGROUND OF THE INVENTION

The invention relates in general to pressure measurement and in particular to the measurement of fluid pressure on projectiles launched from gun tubes.

Projectiles launched from tubes such as barrels, rifles, cannons, etc. require a gas seal. The gas seal enables pressure to build up behind the projectile. The pressure applies a force on the base of the projectile thereby accelerating the projectile down the barrel and achieving a desired muzzle velocity. The desired muzzle velocity enables the projectile to fly far enough or fast enough to impact a point downrange.

Gas seals have evolved over the years from gas checks, paper, plastic, metal, wadding or a combination thereof to obturators. Obturators can be highly efficient pressure seals, but in most launch tubes some amount of propellant gas or pressure escapes past the obturator. The escaped gas or pressure is known as blow-by.

The obturator can be located almost anywhere on the projectile, for example, behind the projectile, on the projectile base or toward the front of the projectile. Regardless of the location of the obturator, some pressure will leak past the obturator and act on the projectile. The amount of leakage or blow-by is often not well characterized.

Pressure leakage past the obturator can be detrimental to the round or projectile. Blow-by may prevent the round from exiting the tube by imposing a buckling force on the projectile. Blow-by may mechanically deform the round and/or damage it so that the round interferes with the barrel wall. Interference of the projectile with the barrel wall may ruin the barrel and/or the projectile. In the case of high explosive rounds, a deformed projectile may explode and injure or kill nearby personnel.

Measurements of, for example, the pressure on the base of a gun-launched projectile, the amount of blow-by gas, and the pressure of blow-by gas are needed for many reasons. These measurements are needed, for example, to determine the interior ballistics of a weapon system, the margin of safety for the pressure seal or obturator, the characteristics of a new projectile, and/or the interoperability of munitions across standardized weapons.

Past methods of determining acceptable performance of gun-launched projectiles include statistical analysis of large numbers of fired rounds. The statistical methods enable one to gain confidence in a particular projectile design only by the sheer volume of successful firings. When the cost of projectiles is high or if a projectile is in a developmental stage, a more cost effective and scientific method is the use of instrumented projectiles. Instrumented projectiles can be used to evaluate interior ballistics, measure the amount of base pressure, and measure the amount of blow-by. The instruments may be pressure gauges or electronic instruments.

Pressure gauges are most often electro-mechanical systems that use piezoelectric materials. When crushed, the piezoelectric materials generate a voltage. The amount of voltage is proportional to the amount of force applied to the crystal or materials, so one can calibrate a gauge and correlate the measured voltage to a well-defined static or dynamic pressure. When placed on projectiles, these gauges experience extreme accelerations. These accelerations also apply inertial loads to the piezoelectric materials thereby imparting some bias or error to the measured signal. These gauges also require ports to enable the pressure to act on the gauge. The ports must be recessed enough to prevent impact from the propellant gas and from the barrel. The manner in which the ports are exposed to the pressure is often of significance because pressure waves within the port can prevent accurate measurements. Even if the gauge components are correctly machined, calibrated, oriented, ported and installed, the electronic data collecting system is very expensive and susceptible to damage. The damage leads to erroneous measurements.

Another method of measuring pressure on a projectile uses pressure-sensitive tape applied to the outside of the projectile. The tape materials are similar to the gauges in that the crystal structure of the tape has a known resonant frequency and wavelength. When the tape is applied to the projectile and exposed to the gas pressure, the change in the crystal structure produces a frequency shift that can be observed as a change in color. Pressure-sensitive tapes are, to some extent, sensitive to the heat applied to them by the combustion of the propellant. In addition, the pressure-sensitive tapes can separate from the projectile and scatter across the test range, thereby eliminating their usefulness. Even if the tape remains on the projectile, the change in material structure and appearance may require spectrum analysis because the color shift may be perceived differently by different observers.

One method of measuring gun chamber pressures uses copper spheres and anvils. When compressed, the anvil crushes the sphere and creates two flats on the sphere. The measurement across the flats is compared to previously validated data to determine maximum chamber pressure. The copper spheres are not suitable for use on projectiles.

Examples of pressure measurement methods are disclosed in U.S Patent Application Publication US2012/0312092 published on Dec. 13, 2012; U.S. Pat. No. 7,600,421 issued on Oct. 13, 2009; U.S. Pat. No. 7,058,549 issued on Jun. 6, 2006; U.S. Pat. No. 3,706,229 issued on Dec. 19, 1972; and U.S. Pat. No. 3,122,919 issued on Mar. 3, 1964.

A need exists for a low cost, accurate, and dependable apparatus and method for measuring fluid pressure on gun-launched projectiles.

SUMMARY OF INVENTION

One aspect of the invention is a method of determining fluid pressure on a projectile launched from a tube. The method includes providing a projectile having a plurality of voids formed in the external surface of the projectile. The voids have a known size, shape, and location on the projectile. Each void is covered with a thin metallic layer of material. The projectile is launched from the tube. Fluid pressure acting on the projectile alters the volume of one or more of the plurality of voids by deforming the thin metallic layer of material into the void volume. The projectile is recovered and the change in the void volume caused by deformation of the thin layer of material into the void volume is measured. The measured change in void volume is correlated to values of fluid pressure that caused the change in void volume.

The method may include hermetically sealing each void to prevent fluid from entering each void. The voids may be formed in the base bottom of the projectile, in the body of the projectile, or in an ogive portion of the projectile.

Another method of determining fluid pressure on a projectile launched from a tube includes providing a projectile that includes a metallic cylindrical body wall and a central longitudinal axis. A portion of the cylindrical body wall has an outer diameter and a radial thickness. The portion of the cylindrical body wall is altered by reducing its radial thickness and forming a plurality of indentations of known geometry on the radially outermost surface of the reduced thickness portion. The method includes fixing a metallic cylindrical sleeve over the reduced thickness portion. The cylindrical sleeve has the same outer diameter as the outer diameter of the portion of the cylindrical body wall.

The projectile is launched from the tube. The cylindrical sleeve is deformed into the plurality of indentations on the reduced thickness portion to produce a deformed cylindrical sleeve. The projectile is recovered and the deformations in the deformed cylindrical sleeve are measured. The measured deformations are correlated to values of fluid pressure that caused the measured deformations.

The step of correlating may include comparing the measured deformations to deformations created by hydrostatic tests and/or comparing the measured deformations to computer simulated deformations.

The step of reducing the radial thickness may include machining the portion of the cylindrical body wall, and the step of forming a plurality of indentations may include forming a plurality of indentations in the machined portion of the body wall.

The step of altering the portion of the body wall may include removing the portion of the body wall from the projectile and installing a test body wall having the reduced thickness.

The step of forming a plurality of indentations may include forming a plurality of indentations that extend axially along and circumferentially around the reduced thickness portion.

The step of forming a plurality of indentations may include forming a plurality of indentations wherein each indentation has a central longitudinal axis that is normal to the central longitudinal axis of the projectile.

Another aspect of the invention is a projectile having a hollow cylindrical body made of a metallic material, a central longitudinal axis, and an outer diameter. A thin-walled metallic sleeve is fixed on an axial segment of the body. The sleeve has the same outer diameter as the body. A second hollow cylindrical body is made of a metallic material and has a central longitudinal axis collinear with the axis of the body. The second body is disposed radially inward of and concentric with the sleeve and is fixed to the sleeve. A plurality of indentations are formed in the radially outermost surface of the second body. Fluid pressure acting on the sleeve deforms the sleeve into the plurality of indentations.

Each indentation may have a central longitudinal axis that is normal to the central longitudinal axis of the hollow cylindrical body. Each indentation may be symmetric about its central longitudinal axis.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a side cutaway schematic view of one embodiment of a projectile.

FIG. 2 is a side cutaway schematic view of an altered portion of the projectile of FIG. 1.

DETAILED DESCRIPTION

Figure 3:
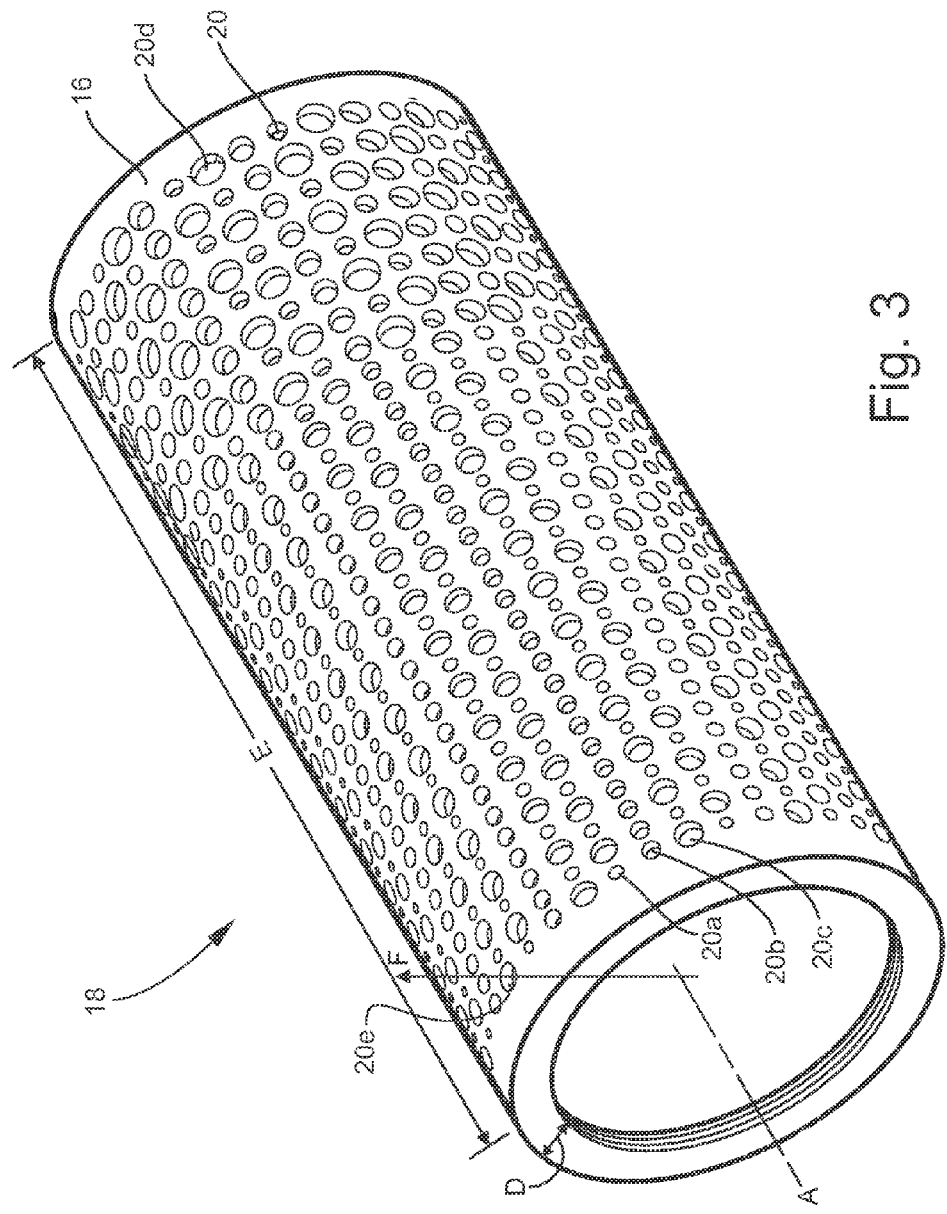
FIG. 3 is a perspective view of the altered portion of FIG. 2 showing indentations formed therein.

A novel apparatus and method for measuring fluid pressure on the external surface of a gun-launched projectile relies on the known response of a specific material or materials to an applied force. Using Hooke's Law in conjunction with stress/strain curves for the specific materials, the known responses of the materials are used to calibrate permanent deflections of the materials that result from pressure acting on them. The pressure may be, for example, gas pressure in the interior of a gun tube, such as blow-by pressure or base pressure. The measured pressure may also be applied to the external surface of the projectile by an object that is impacted and penetrated by the projectile after the projectile leaves the gun tube.

The novel apparatus and method are mechanical in nature and eliminate the need for electronic instrumentation and its problems. The materials used are well-characterized metallic materials. The materials remain on the projectile throughout the interior and exterior ballistic cycle. The method enables the actual mapping of pressure forces over the external surface of the projectile body. The projectile caliber may vary from about 0.17 inches to about 18 inches. The projectile may be launched from a smooth-bore or rifled gun tube.

In the external surface area of the projectile where pressure measurement is desired, one or more voids are formed. The void or voids have a known size and shape. The voids are covered with a thin layer of metallic material. Pressure acting on the thin layer of material plastically deforms the thin layer into the voids. The amount of deflection of the thin layer of material into each void, the total amount of deformed material at each void, and/or the change in void volume at each void are related to the pressure applied to the thin layer at each respective void.

In one embodiment of the invention, the projectile is altered by removing material from its outer surface or radial wall thickness. One or more voids or indentations are formed in the surface of the projectile or in the area of reduced diameter or thickness. Preferably, and depending on the size of the projectile, a plurality of the voids are formed in the area of pressure measurement interest. The location, size, and geometry of the voids are not arbitrary. The voids are placed at locations selected for pressure measurement. The size and geometry of the voids are selected based on, among other factors, estimates of maximum pressure. The geometry of each void is preferably symmetric. The size, geometry and volume of the voids may vary from one void to another.

The voids are covered with a thin layer of structural material having well-characterized mechanical properties, for example, aluminum, steel, or stainless steel. The outer diameter or profile of the thin layer of structural material is the same as the original outer diameter or profile of the selected pressure measurement area on the projectile. Thus, the altered projectile will have an external profile and external dimensions which are substantially the same as if the projectile had not been altered for pressure measurement. Preferably, the voids are hermetically sealed to prevent leakage of fluid external to the projectile into the voids.

Pressure from propellant gas or pressure from a target impact causes the thin layer of structural material to plastically deform into the voids in the projectile. After the projectile has come to rest, the projectile is recovered. Then, measurements are made of the amount of deflection of the thin layer of material into each void, the total amount of deformed material at each void, and/or the change in void volume at each void. The measured deflection, total deformation or change in void volume is then correlated to pressure to obtain a maximum pressure at each void.

Varying the size of the void or the thickness of the thin layer of material alters the amount of force required to plastically deform the layer of material into the void. The size, geometry and depth of the voids and the thickness of the thin layer of material may be chosen to prevent the thin layer of material from completely plastically deforming into the void or fracturing. The size, depth, and geometry of adjacent voids may be varied to create multiple measurement points and pressure resolutions in a small area. Multiple measurement points may help to null erroneous measurements or to expose anomalies in the thin layer of material, for example, non-homogeneities such as cracks, empty spaces, etc. Multiple void geometries help increase measurement resolution by altering the strain and deformation in the thin layer of material that is caused by the applied pressure.

When measuring base pressure in the launch tube, the portion of the projectile selected for pressure measurement will typically be a selected base surface area of the projectile aft of the obturator groove. In one embodiment of the invention, the selected portion of the projectile base remains integral with the remainder of the projectile body while its configuration is altered and prepared for pressure measurement. In another embodiment of the invention, the selected portion of the projectile base is removed from the remainder of the projectile body and then replaced with a portion that is configured for pressure measurement.

When measuring blow-by pressure in the launch tube, the portion of the projectile selected for pressure measurement will typically be a selected axial length of the cylindrical projectile body. In one embodiment of the invention, the selected portion of the projectile body remains integral with the remainder of the projectile body while its configuration is altered and prepared for pressure measurement. In another embodiment of the invention, the selected portion of the projectile body is removed from the remainder of the projectile body and then replaced with a portion that is configured for pressure measurement.

When measuring hydraulic loading pressure from fluid impact, the portion of the projectile selected for pressure measurement will typically be a selected axial length of the projectile ogive. In one embodiment of the invention, the selected portion of the projectile ogive remains integral with the remainder of the projectile body while its configuration is altered and prepared for pressure measurement. In another embodiment of the invention, the selected portion of the projectile ogive is removed from the remainder of the projectile body and then replaced with a portion that is configured for pressure measurement.

FIG. 1 is a side cutaway schematic view of one embodiment of a projectile 10 having a central longitudinal axis A and an outer cylindrical metallic casing or body wall 12. Projectiles that differ from projectile 10 may also use the novel method. Body wall 12 may include an obturator slot 14.

An obturator (not shown) is disposed in slot 14 prior to launch of projectile 10. Projectile 10 has an outer diameter or caliber B and a body wall thickness C. One use of the novel method is to measure the obturator blow-by pressure on, for example, the portion or region 18 of the projectile 10 shown in FIG. 1. Portion 18 has an axial length E.

The body wall 12 of portion 18 may be altered by reducing its radial thickness C to a lesser thickness D, as shown in FIG. 2. Then, a plurality of voids or indentations of known geometry are formed at specific locations on the radially outermost surface 16 of the reduced thickness portion 18. FIG. 3 is a perspective view of portion 18 with a plurality of indentations 20 formed therein. The remainder of projectile 10 is not shown in FIG. 3, only portion 18. Indentations 20 may extend axially along and circumferentially around the reduced thickness portion 18.

Indentations 20 in FIG. 3 have the shape of right circular cylinders, although other shapes may be used, including differing shapes on the same projectile. Indentations 20 may also vary in size and depth. For example, indentations 20 may increase in size from the smallest indentation 20a to 20b to 20c to the largest indentation 20d. As shown in FIG. 3 for indentation 20e, each indentation 20 may have a central longitudinal axis F that is normal to axis A of projectile 10. Preferably, each indentation 20 is symmetric about its axis F.

The reduced wall thickness of portion 18 may be created by machining material from body wall 12 and then forming the indentations 20 in the machined, reduced thickness portion. In this way, portion 18 remains integral with projectile 10. Alternatively, portion 18 may be completely removed from projectile 10 and a specially fabricated test piece or portion installed in projectile 10 in place of portion 18. The specially fabricated piece may be installed in projectile 10 using, for example, threaded joints, welding, chemical adhesion, etc.

Figure 4A:
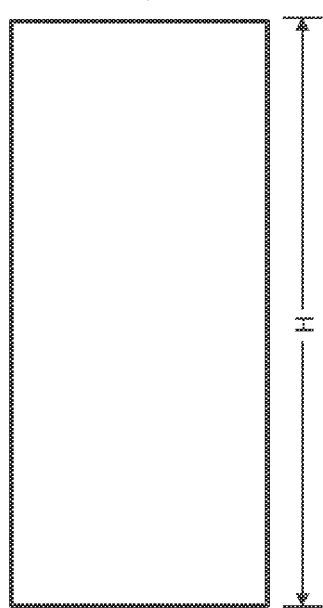
FIGS. 4A and 4B are front and side views, respectively, of a sleeve.
Figure 4B:
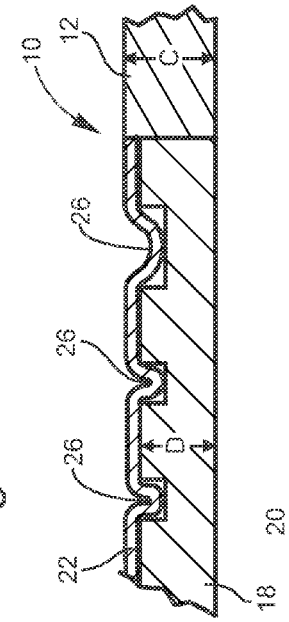

FIGS. 4A and 4B are front and side views of a thin-walled, structural, metallic cylindrical sleeve 22. Sleeve 22 has an outer diameter B that is the same as the original outer diameter of portion 18 before its wall thickness was reduced. Sleeve 22 has an inner diameter G that forms a sliding fit with the outer diameter of the reduced diameter portion 18 and an axial length H equal to axial length E of portion 18. Sleeve 22 is installed over reduced diameter portion 18 and fixed in placed by, for example, welding. In the embodiment where reduced diameter portion 18 remains integral with projectile 10 while being configured for pressure measurement, sleeve 22 may be split axially into two pieces and then fixed in place over reduced diameter portion 18.

Figure 5:
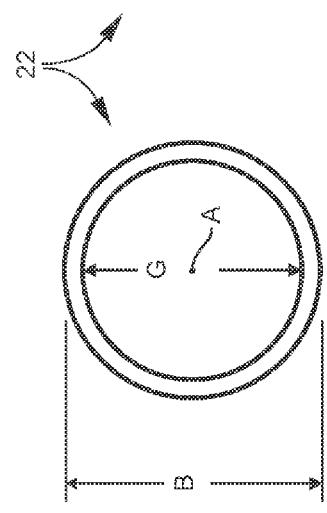
FIG. 5 is a longitudinal, sectional, partial view of a projectile that has been altered for pressure measurement.
Figure 6:
FIG. 6 is a schematic drawing of a gun tube.
Figure 7:
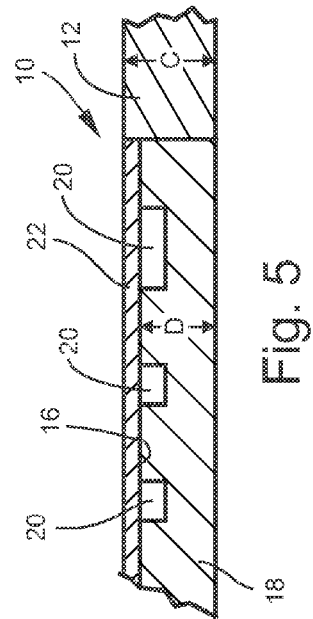
FIG. 7 is shows the projectile of FIG. 5 after deformation.

FIG. 5 is a longitudinal, sectional, partial view of projectile 10 showing the forward end of portion 18 with indentations 20 and sleeve 22. After configuration of the pressure measurement portion 18, projectile 10 is launched from a gun tube 24, shown schematically in FIG. 6. During launch, propellant gas that blows by the obturator in slot 14 will deform sleeve 22 into indentations 20. FIG. 7 shows the sleeve 22 of FIG. 5 with deformations 26 extending into indentations 20. When the projectile 10 comes to rest, deformations 26 are measured and correlated with values of fluid pressure to determine the maximum pressures exerted on sleeve 22.

One way to correlate the measurements of deformations 26 with pressure exerted on sleeve 22 is to hydrostatically test the projectile 10 in a test tank. In the test tank, the projectile 10 has sleeve 22 installed over the indentations 20. Using the test tank, a data set that contains measures of deformation of sleeve 22 and corresponding hydrostatic pressures is created. The measurements of deformations 26 are then compared to the test tank data set to determine the values of the propellant pressure or other forces that caused deformations 26.

Another way to correlate the measurements of deformations 26 with pressure exerted on sleeve 22 is to use energy-based computer simulations of the interior ballistic cycle to calculate plastic strain and deformation. A computerized finite element analysis (FEA) may be performed on the projectile configuration using interior ballistic cycle loads, inputs, constraints, and actual material properties. The FEA may be performed using, for example, the ABAQUS FEA computer software program to calculate accumulated plastic strain or equivalent plastic strain, known as PEEQ resulting from the simulation. The measurements of deformations 26 may then be compared to the computer-modeled plastic strains and deformations resulting from the simulation pressures. The simulated pressures and resultant deformations in model space may be used to create an equation or look up table to determine the magnitude of the pressures or forces that caused the deformations 26 in reality.

The embodiments of FIGS. 1-7 show projectile 10 with a reduced diameter portion 18 in which indentations 20 are formed. However, voids or indentations may be formed directly in body wall 12 of projectile 10 without reducing its diameter. In this case, sleeve 22 is not used. The voids may be formed by, for example, drilling or machining body wall 12. The thin layer of material for each void may be, for example, a metal cover welded flush with the adjacent external surface of body wall 12. Or, in lieu of welding, a hollow metal insert may be fixed in each void. The hollow metal insert has a top surface that is flush or even with the adjacent external surface of body wall 12. The hollow metal inserts may be fixed in each void, by, for example, press fitting or threading the hollow metal inserts in each void.

FIGS. 1-7 relate to measuring pressure, such as blow-by pressure, on the generally cylindrical curved surface of projectile 10. However, the pressure on other parts of a projectile, such as the ogive or the base, may be measured as well. Measurements of fluid pressure on the ogive may be useful, for example, for analyzing terminal ballistics. Measurements of fluid pressure on the base may provide an indication of the breech pressure.

Figure 8A:
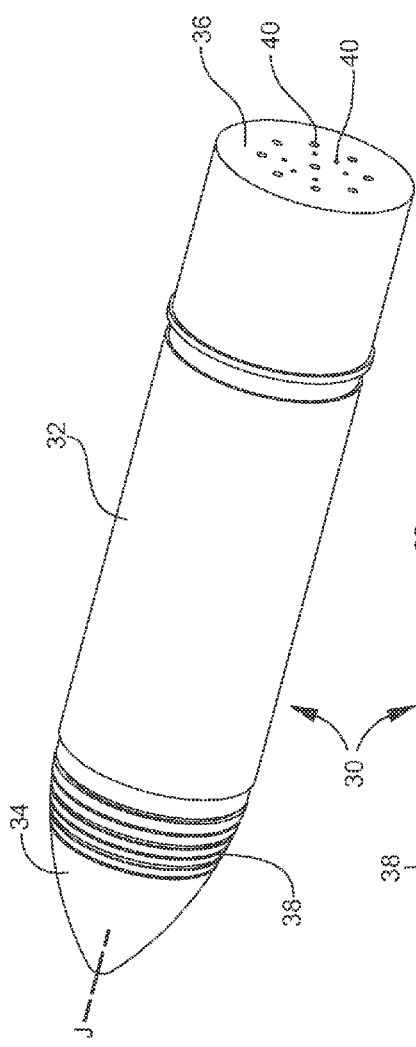
FIGS. 8A, 8B and 8C are perspective, side, and longitudinal sectional views, respectively, of another embodiment of a projectile.
Figure 8B:
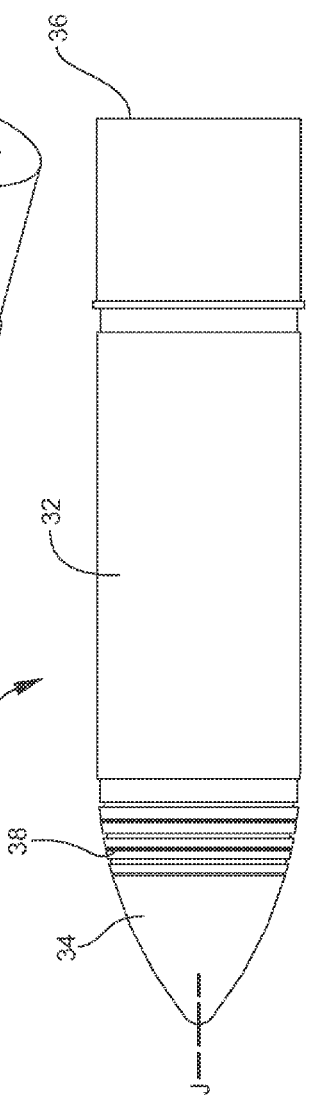
Figure 8C:
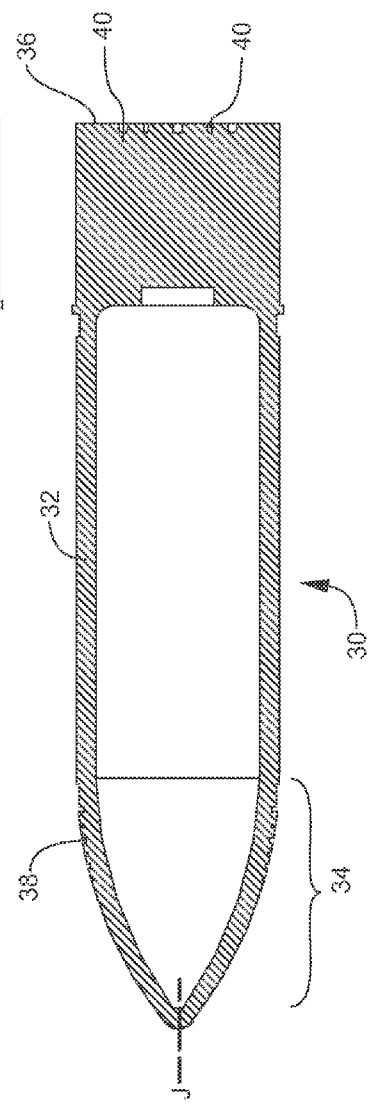

FIGS. 8A, 8B and 8C are perspective, side, and longitudinal sectional views, respectively, of a projectile 30 having a central longitudinal axis J. Projectile 30 includes a generally cylindrical body wall 32, an ogive portion 34, and a base bottom 36. Voids for pressure measurement may be formed in ogive portion 34 and/or base bottom 36. For example, one or more circumferential grooves 38 may be formed in ogive portion 34, and one or more indentations 40 may be formed in base bottom 36. As discussed above with reference to portion 18 of projectile 10, ogive portion 34 and base bottom 36 may remain integral with projectile 30 while being altered for pressure measurement, or ogive portion 34 and base bottom 36 may be removed from the remainder of projectile 30 and then replaced with an ogive portion or base bottom that is configured for pressure measurement.

Grooves 38 and indentations 40 may be formed by removing material from the external surface of ogive portion 34 and base bottom 36, respectively. Removing material may include reducing the external dimensions of a portion or all of ogive portion 34 or base bottom 36, in addition to removing material to create grooves 38 and indentations 40. Removing the additional material enables installation of a monolithic thin layer of metallic material, similar to sleeve 22. Then, in a manner analogous to sleeve 22, a monolithic thin layer of metallic material may be fixed over grooves 38 and another monolithic thin layer of metallic material may be fixed over indentations 40. The monolithic thin layers of material plastically deform into grooves 38 or indentations 40 when subjected to external fluid pressure. The thin layers of material are preferably hermetically sealed over grooves 38 and indentations 40 to prevent external fluid leakage into grooves 38 and indentations 40.

Alternatively, and as discussed above with regard to projectile 10, grooves 38 and indentations 40 (or other types of voids) may be formed directly in ogive portion 34 and base bottom 36, without removing other material adjacent to grooves 38 or indentations 40. Grooves 38 and indentations 40 may be formed by, for example, drilling or machining ogive portion 34 and base bottom 36, respectively. Each individual groove 38 or indentation 40 is then covered by a respective thin layer of metallic material. The thin layer of metallic material for each groove 38 and indentation 40 may be, for example, individual metal covers that are welded flush with the adjacent external surface of ogive portion 34 or base bottom 36.

In lieu of welding a separate cover for each void, a hollow metal insert may be fixed in each groove 38 or indentation 40. The hollow metal insert for a groove 38 may be an annular ring having a top surface that is flush or even with the adjacent external surface of ogive portion 34. The hollow metal insert for an indentation 40 has a top surface that is flush or even with the adjacent external surface of base bottom 36. The hollow metal inserts may be fixed in each groove 38 or indentation 40 by, for example, press fitting or threading the hollow metal inserts in each groove or indentation.

Figure 9:
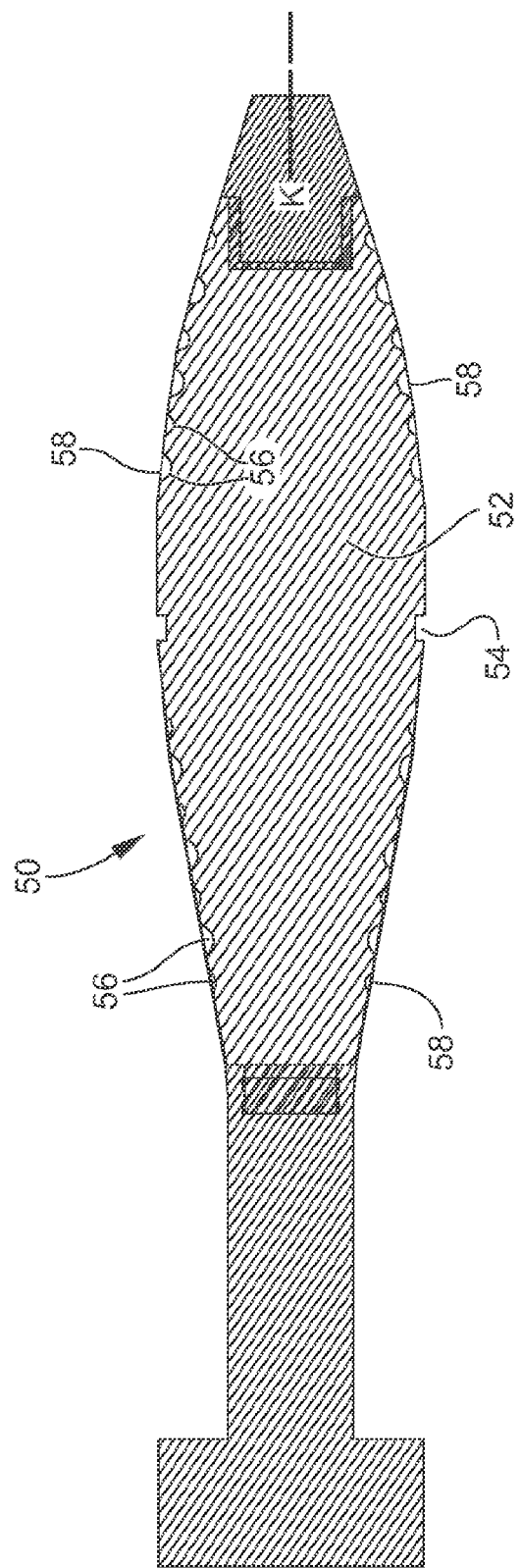
FIG. 9 is a longitudinal sectional view of a mortar projectile.

FIG. 9 is a longitudinal sectional view of a mortar projectile 50 having a central longitudinal axis K. Projectile 50 includes a body portion 52 having an obturator slot 54. Voids 56 are formed in body portion 52. Voids 56 may be located both fore and aft of obturator slot 54. Voids 56 are covered with a thin metallic layer 58 that deforms plastically into voids 56 due to fluid pressure applied on the outer surface of layer 58. Preferably, thin metallic layer 58 hermetically seals voids 56. In FIG. 9, voids 56 are shown with a curved cross-section, but many other cross-sectional shapes may be used. The size of each void 56 may vary from one void to another. Voids 56 may be circumferential grooves, similar to grooves 38 shown in FIGS. 8A-C, or, voids 56 may be individual indentations, similar to indentations 20 shown in FIG. 3, for example.

Among other methods, the various methods disclosed herein that may be used to fabricate the pressure measuring portions of projectile 10 (FIGS. 1-5 and 7) and projectile 30 (FIGS. 8A-C) may also be used to fabricate body portion 52 having voids 56 and thin metallic layer 58.

While the invention has been described with reference to certain embodiments, numerous changes, alterations and modifications to the described embodiments are possible without departing from the spirit and scope of the invention as defined in the appended claims, and equivalents thereof.

What is claimed is:

1. A method of determining fluid pressure on a projectile launched from a tube, comprising:

providing a projectile that includes a metallic cylindrical body wall and a central longitudinal axis, a portion of the cylindrical body wall having an outer diameter and a radial thickness;

altering the portion of the cylindrical body wall by reducing the radial thickness and forming a plurality of indentations of known geometry on a radially outermost surface of the reduced thickness portion;

fixing a metallic cylindrical sleeve over the reduced thickness portion, the cylindrical sleeve having a same outer diameter as the outer diameter of the portion of the cylindrical body wall;

launching the projectile from the tube;

deforming the cylindrical sleeve into the plurality of indentations on the reduced thickness portion to produce a deformed cylindrical sleeve;

recovering the projectile;

measuring deformations in the deformed cylindrical sleeve; and correlating the measured deformations to values of fluid pressure that caused the measured deformations.

2. The method of claim 1, wherein correlating includes comparing the measured deformations to deformations created by hydrostatic tests.

3. The method of claim 1, wherein correlating includes comparing the measured deformations to computer simulated deformations.

4. The method of claim 1, wherein reducing the radial thickness includes machining the portion of the cylindrical body wall and forming a plurality of indentations includes forming a plurality of indentations in the machined portion of the body wall.

5. The method of claim 1, wherein altering the portion of the body wall includes removing the portion of the body wall from the projectile and installing a test body wall having the reduced thickness.

6. The method of claim 1, wherein forming a plurality of indentations includes forming a plurality of indentations that extend axially along and circumferentially around the reduced thickness portion.

7. The method of claim 6, wherein forming a plurality of indentations includes forming a plurality of indentations wherein each indentation has a central longitudinal axis that is normal to the central longitudinal axis of the projectile.

8. The method of claim 7, wherein forming a plurality of indentations includes forming a plurality of indentations that have more than one size.

9. The method of claim 8, wherein forming a plurality of indentations includes forming a plurality of indentations that have more than one geometric shape.

10. A projectile, comprising:
a hollow cylindrical body made of a metallic material and having a central longitudinal axis and an outer diameter;
a thin-walled metallic sleeve fixed on an axial segment of the body, the sleeve having a same outer diameter as the body;
a second hollow cylindrical body made of a metallic material and having a central longitudinal axis collinear with the axis of the body, the second body being disposed radially inward of, concentric with, and fixed to the sleeve; and
a plurality of indentations formed in a radially outermost surface of the second body wherein pressure acting on the sleeve deforms the sleeve into the plurality of indentations.

11. The projectile of claim 10, wherein each indentation has a central longitudinal axis that is normal to the central longitudinal axis of the hollow cylindrical body.

12. The projectile of claim 11, wherein the plurality of indentations extend axially along and circumferentially around the second body.

13. The projectile of claim 12, wherein the plurality of indentations includes indentations of more than one size.

14. The projectile of claim 13, wherein the plurality of indentations includes indentations of more than one geometric shape.

15. The projectile of claim 14, wherein each indentation is symmetric about its central longitudinal axis.

16. A method of determining fluid pressure on a projectile launched from a tube, comprising:
providing a projectile that includes a plurality of voids formed in an external surface of the projectile, the voids having a known size, shape, and location on the projectile;
covering each void with a thin metallic layer of material;
launching the projectile from the tube;
altering a volume of one or more of the plurality of voids by deforming the thin metallic layer of material into the void volume;
recovering the projectile;
measuring a change in the void volume caused by deformation of the thin layer of material into the void volume; and
correlating the measured change in void volume to values of fluid pressure that caused the measured change.

17. The method of claim 16, wherein covering each void includes hermetically sealing each void to prevent fluid from entering each void.

18. The method of claim 16, wherein the voids are formed in a base bottom of the projectile.

19. The method of claim 16, wherein the voids are formed in an ogive portion of the projectile.

20. The method of claim 19, wherein the voids comprise circumferential grooves.

* * * * *